Oct. 1, 1968   M. PASHA   3,403,498
METHOD FOR REMOVING SAPONIFIABLE AND FOREIGN
SUBSTANCES FROM A GAS STREAM
Filed Nov. 4, 1966                2 Sheets-Sheet 1

INVENTOR.
Mohiuddin Pasha
BY

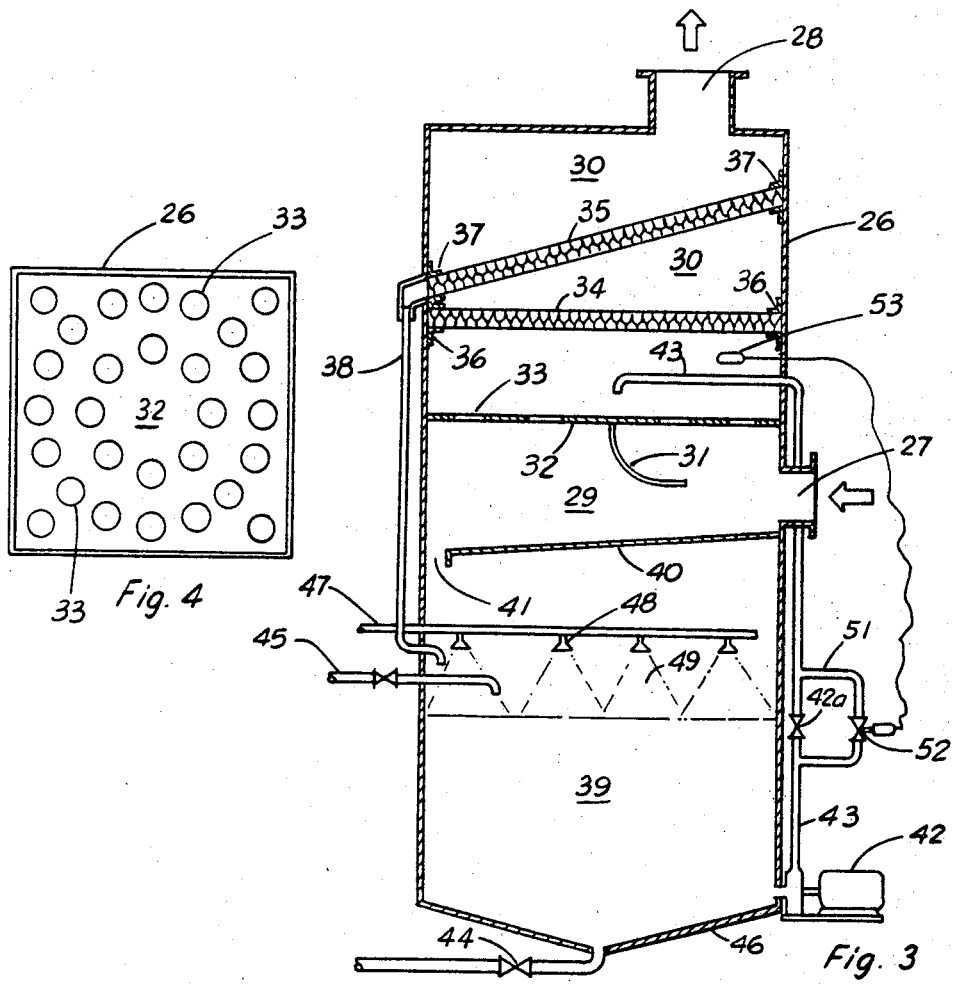

United States Patent Office 3,403,498
Patented Oct. 1, 1968

3,403,498
METHOD FOR REMOVING SAPONIFIABLE AND FOREIGN SUBSTANCES FROM A GAS STREAM
Mohiuddin Pasha, Louisville, Ky., assignor to American Air Filter Company, Inc., Louisville, Ky., a corporation of Delaware
Filed Nov. 4, 1966, Ser. No. 592,212
3 Claims. (Cl. 55—90)

ABSTRACT OF THE DISCLOSURE

The present invention relates to a method for eliminating foreign materials carried by a stream of gas and, more particularly, relates to a method for the removal of foreign materials, including saponifiable substances, entrained in a gas stream.

---

It is frequently desirable to remove saponifiable substances from gas streams emitted from various industrial, commercial, and domestic sources because such materials usually have objectionable odors. If present in sufficient concentration such materials can be harmful and are considered to be air pollutants. Some previous systems for removing saponifiable substances, for example oleaginous, fatty, and waxy materials from gas stream have included mechanical elements, for example dry mesh pads, disposed within the gas stream so the saponifiable substances impinge directly on the pads to be deposited thereon. Such mechanical means have not been entirely satisfactory, partly because the pads or other mechanical elements are sticky and the elements then collect dirt and other foreign materials entrained in the gas stream. In many instances it is desirable to remove such dirt and other foreign matter from gas streams, but the collection of dirt and other foreign matter plugs the elements to undesirably restrict the flow of gas. In such previous arrangements, frequent maintenance is required to clean the elements and maintain the desired gas flow.

Furthermore, such dry mechanical collecting means constitute a fire hazard because the saponifiable substances which condense on the mechanical separating means are flammable. If ignition occurs, and the gas stream in which the saponifiable substances carried is air, the saponifiable substances burn furiously and the undesirable situation is aggravated because the combustion is supported by oxygen from the air stream.

Other means have been provided to remove saponifiable materials from a gas stream and have included bubbling thte stream of gas through liquids or spraying selected caustic solutions into the gas stream in the direction of flow and subsequently separating the liquid from the gas stream. In the latter system complicated means have been required to separate the mixed liquid and gas streams. Furthermore, it has been found that many such washing systems do not decrease the concentration of saponifiable substances to acceptable concentrations because it is difficult to achieve the degree of mixing required for the satisfactory removal of saponifiable material from the gas stream. It will be noted that in systems where a liquid is sprayed into the gas stream, increased mixing efficiency, or degree of dispersion of liquid in the gas stream, leads to improved removal of the entrained saponifiable substances but also makes the separation of the liquid and gas streams increasingly more difficult. Furthermore, it is to be realized that liquid not removed from the gas stream is undesirably carried out of the system with the gas stream.

In accordance with the present invention, an improved method is provided to remove saponifiable substances from a gas stream and react the saponifiable substances under conditions where the reaction product is easily removed from the air stream without presenting a fire hazard. Moreover, the present invention advantageously provides a unique arrangement for the combined use of mechanical separating means and liquid washing means to efficiently remove saponifiable substances and other materials from an air stream. It has been recognized that the novel apparatus and method in accordance with the present invention further provides for the removal of dirt and particulate matter entrained in the gas stream by impingement on mechanical separating means and, advantageously, provides means to clean the surface of such means to prevent plugging of the separating means and eliminate the maintenance and frequent cleaning required by previous apparatus. The novel, straightforward, apparatus and method in accordance with the present invention further provides for efficient liquid-gas contact to advantageously promote saponification of selected substances carried by the gas stream and further provides means so that the liquid is expeditiously separated from the gas stream to prevent liquid carryover from the separator system.

Various other features of the present invention will become obvious to one skilled in the art upon reading the disclosure set forth hereinafter.

More particularly, the method for removing saponifiable material from a gas stream in accordance with the present invention includes: passing the stream of gas through labyrinth means so the gas stream impinges on the labyrinth means and saponifiable substances carried by the gas stream are deposited on the labyrinth means; distributing a selected liquid saponification agent over at least a portion of the surface of the labyrinth means to saponify the saponifiable substances deposited thereon; and, removing liquid including unreacted saponification agent and saponification products from the labyrinth means while permitting the gas stream to pass through the labyrinth means.

It will be realized by those skilled in the art that various changes can be made in the arrangement, form, or configuration of the apparatus and method disclosed herein without departing from the scope or spirit of the present invention.

Referring to the drawings which show an apparatus and illustrate a method in accordance with the present invention:

FIGURE 3 is a view, in section, of an apparatus in accordance with the present invention for the elimination of saponifiable materials from a gas stream flowing in a vertical direction; and, FIGURE 4 is a view taken along a plane passing through line 4—4 of FIGURE 3.

The examples of the apparatus and method in accordance with the present invention as shown in the figures provide generally for gas-liquid contact between a dirty gas stream carrying saponifiable substances and a selected saponification agent for example, a caustic solution. The dirty gas stream impinges on a labyrinth type mechanical separating device to deposit the saponifiable substances carried by the gas stream where, advantageously, the saponifiable substances react with the caustic solution to form "soap." Liquid solution including the soap, unreacted caustic solution, and other foreign materials is then removed from the labyrinth means to carry the foreign materials out of the gas stream while the soap resulting from the saponification reaction cleans the labyrinth means.

Figure 1:
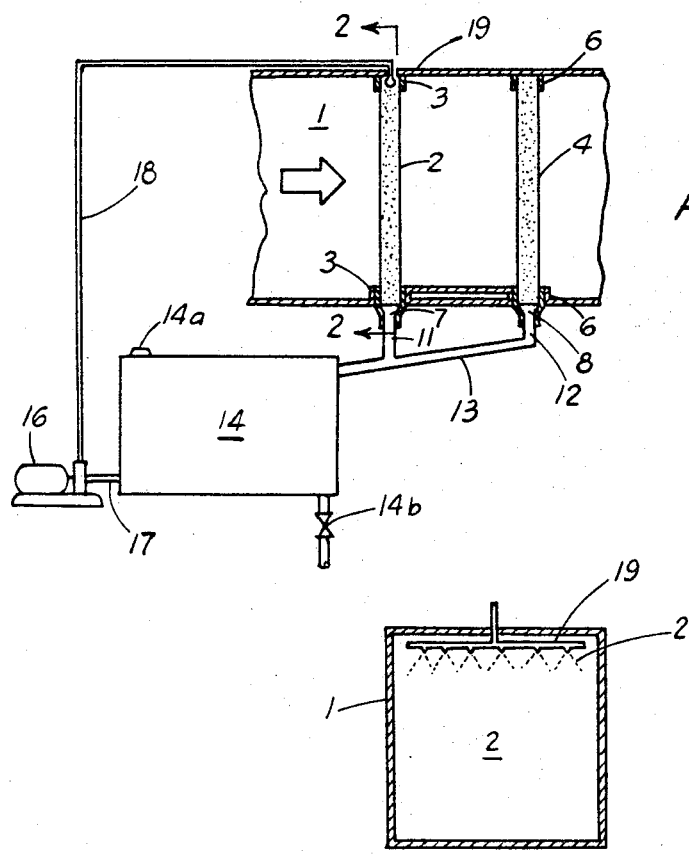
FIGURE 1 is a view, partly in section, of an apparatus in accordance with the present invention for the elimination of saponifiable materials entrained in a gas stream flowing in a duct.

In the example of FIGURE 1, a labyrinth type mechanical separating device is advantageously disposed in horizontal duct 1 to remove saponifiable materials from a gas stream which impinges on the labyrinth means. The labyrinth means shown in FIGURE 1 includes a first labyrinth which can be, for example, a porous woven wire pad 2 of crimped Monel wire. Pad 2 is disposed transverse the direction of flow of gas through duct 1 so the gas stream passes through the thickness of the pad to provide a maximum flow area and a minimum resistance to air flow. Pad 2 can be retained in duct 1 by inwardly directed flanges 3 cooperatively joined to the sides of duct 1. The example of FIGURE 1 includes a second labyrinth, for example a porous pad 4 similar to construction to pad 2, which can be disposed in duct 1 a selected distance downstream of pad 2 in a position transverse the direction of flow of gas in duct 1. Pad 4 is retained in position by flanges 6 cooperatively affixed to the inside surfaces of duct 1. Liquid outlets 7 and 8 are advantageously provided in the bottom of duct 1 adjacent the bottom edges of pads 2 and 4, respectively, for removal of liquid from the pads. In the arrangement shown in FIGURE 1, outlets 7 and 8 communicate with the conduits 11 and 12 respectively, and conduits 11 and 12 communicate with manifold conduit 13 to return liquid from outlets 7 and 8 to a reservoir, for example tank 14. Tank 14 can include fill means such as a cap 14a for the addition of makeup fluid, as needed, and a drain valve for the removal of exhausted fluid from the tank. The liquid retained in tank 14 can be, for example, a selected caustic solution hereinafter discussed.

Figure 2:
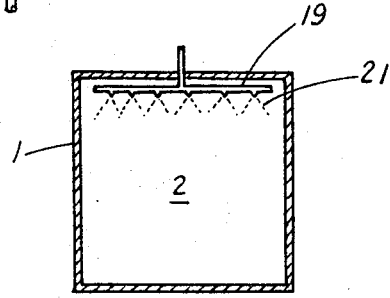
FIGURE 2 is a view taken along a plane passing through lines 2—2 of FIGURE 1.

A pump 16 is connected to tank 14 by means of conduit 17 and is provided to pump liquid from tank 14 to a distributor 19 (FIGURE 2) adjacent the upper edge of pad 2 to direct liquid flow vertically downward through pad 2. In the example of FIGURES 1 and 2 distributor 19 extends horizontally across the upper edges of duct 1 in a direction generally transverse the flow of the gas stream. Distributor 19 has a selected number of spaced fluid outlets 21 directed so caustic liquid emitted through such outlets forms caustic sprays 21a to distribute the caustic solution uniformly through pad 2.

In the operation of the apparatus in accordance with the present invention as shown in FIGURE 1, the dirty gas containing saponifiable substances flows through duct 1 and passes through the openings in pad 2. A portion of the saponifiable materials and other foreign substances entrained in the gas stream are deposited on the surface of the pad. Caustic solution distributed along the upper edge of pad 2 flows downward through pad 2 by gravity to contact the stream of air passing through pad 2 and the saponifiable substances and other materials deposited on the pad. In accordance with the present invention, reaction between saponifiable substances deposited on pad 2 and the caustic solution flowing downwardly through pad 2 occurs on the surface of the pad to convert the saponifiable substances to water soluble soap. In accordance with another advantageous feature of the present invention it has been recognized that the liquid flowing through pad 2, which includes soap from the saponification reaction and unreacted caustic solution, washes dirt and other foreign material from the surface of the pad to provide continuous cleaning for the pad. The liquid flowing through pad 2 is emitted from duct 1 by means of outlet 7 adjacent the bottom edge of pad 2, and the liquid flows to reservoir 14 through conduits 11 and 13.

Not all of the foreign material entrained in the gas stream is deposited on pad 2 and, furthermore, a portion of the caustic solution flowing through the pad is entrained in the gas stream. The entrained caustic solution, saponifiable substances, and other materials not retained on pad 2 are carried downstream by the gas to be deposited on pad 4. The saponifiable materials deposited on pad 4 are further reacted with the caustic solution, also deposited on the pad, to form a soapy solution on the pad. The liquid solution flows downwardly through the pad by gravity and is emitted from duct 1 by means of outlet 8 adjacent the bottom edge of pad 4. The liquid emitted from pad 4 flows through conduits 12 and 13, respectively, and is returned to reservoir 14 to be recirculated through pad 2.

The strength of the caustic solution in tank 14 and the rate at which the solution is supplied to pad 4 is a function of the flow rate of the gas stream and the quantity of saponsifiable substances carried by the gas stream. In some applications very dilute solutions, for example 1% sodium hydroxide in water, can be used for the saponification and in such cases the continuous stream of liquid provided to pad 4 is primarily water. Sodium hydroxide is a relatively inexpensive, easily obtained caustic substance and therefore is used extensively in saponification processes. It will be recognized by those skilled in the art that within the scope of the present invention other saponification solutions also can be used to accomplish the objects of the present invention.

As concentration of the caustic solution in tank 14 is decreased by reaction with the saponifiable substances deposited on the pads, additional caustic solution can be added to tank 14. The concentration of the makeup caustic solution can be greater than the concentration of the solution in tank 14 to decrease the volume of makeup solution required to bring the circulating solution to the desired strength. For example, if the concentration of the caustic in the solution in tank 14 is 1% the concentration of the makeup caustic solution can be 20%.

In accordance with the present invention, it has been recognized that saponification reactions are rapid and saponfiable substances carried by the gas stream are readily converted to soap, or soap-like substances, on the surface of the pad where the conversion of the saponifiable substances leads to the formation of a soapy solution. It has been further recognized that other particulate matter such as dirt or entrained liquids are removed from the air stream by impingement on the pad. Moreover, it has been recognized that the presence of a soapy solution on pads 2 and 4 facilitates removal of such particulate matter deposited on the surface of the labyrinth means so the pads are washed clean by the solution to carry the various impurities out of the system. It is to be noted that, by the method and apparatus in accordance with the present invention, the presence of an undesirable impurity is advantageously used to provide means to continuously clean and wash the means, i.e. the labyrinth means used to eliminate the impurities, so that the efficiency of the gas cleaning and purifying apparatus in accordance with the present invention is increased because maintenance is significantly reduced. Furthermore, it has been recognized that, advantageously, the labyrinth means are cleaned in place and the cleaning is facilitated by the agitation provided by the air stream passing through the labyrinth means so the gas purifying apparatus in accordance with the present invention need not be taken off stream for cleaning.

FIGURE 3 is an example of another arrangement in accordance with the present invention which is particularly suited to treating large quantities of gas wherein the gas stream flows through the apparatus in an upwardly vertical direction and is first passed through a downflowing curtain of caustic solution. After the initial washing in which the gas passes through the downflowing circular curtain of caustic solution, the gas stream is directed toward labyrinth means, including pads 34 and 35 similar to the pads 2 and 4 of FIGURE 1, for separation of the remaining saponifiable materials. Saponifiable materials, and other gas entrained impurities are separated from the gas stream by deposition on the labyrinth means. In accordance with the advantageous features of the present invention pads 34 and 35 of FIGURE 3 are continuously washed and cleaned to remove impurities eliminated from the gas stream by the separator.

The apparatus in accordance with the present invention as shown in FIGURE 3 includes a housing 26 having clean gas outlet 28, an internal chamber 29, and dirty gas inlet 27 communicating with chamber 29 so dirty gas enters chamber 29 through inlet 27. Plate 32 is advantageously disposed in housing 26 in a generally horizontal plane. Chamber 29 is bounded by housing 26 on the sides, by baffle 40 at the bottom, and perforated plate 32 at the top. Plate 32 includes perforations 33 (FIGURE 4) sized and spaced in selected relation as a function of design gas flow through the apparatus. An outlet 41 is provided in the bottom of plate 40 and is disposed to facilitate removal of liquid from chamber 29.

A baffle 31 can be provided to chamber 29 to direct the air stream uniformly to plate 32.

A liquid separating chamber 30 is provided in casing 26 downstream of plate 32 and is in communicative relation with clean gas outlet 28. In accordance with the present invention, labyrinth means, for example woven wire pads 34 and 35, are provided in liquid separating chamber 30. Pad 34 is disposed generally transverse the longitudinal axis of chamber 30 across the flow of gas stream and is retained by flanges 36 cooperatively affixed to housing 26. Advantageously, pad 35 is disposed within chamber 30 across the gas stream in a position downstream of pad 34 at an angle relative to the longitudinal axis of chamber 30 and is retained in position by means of inwardly directed flanges 37 of housing 26. A fluid outlet 38 is provided at the side of housing 26 and includes an inlet end adjacent the lower edge of pad 35 and an outlet end communicating with a liquid caustic reservoir 39.

Caustic solution of selected strength, for example 1% NaOH in water, is provided in reservoir 39 and a pump 42 is provided to pump the caustic solution through a conduit 43 to the top side of perforated plate 32.

In operation, dirty gas enters chamber 29 through inlet 27 and flows upwardly through perforations 33 of plate 32. Baffle 31 is provided to facilitate uniform distribution of air over plate 32.

Caustic solution is pumped to the upper surface of plate 32 which can include means (not shown) to distribute the solution uniformly over the plate, so the caustic solution flows downwardly through perforations 33 and plate 32. The rate of flow of caustic solution to plate 32 can be controlled by a valve 42a and the flow rate is determined, in part, by the rate of flow of gas to the apparatus and the concentration of saponifiable substances carried by the gas stream. The caustic solution flows downwardly through chamber 29 in the form of substantially hollow circular curtains. The dirty gas enters chamber 29 and flows through the curtains of the caustic liquid in countercurrent relation to pass through perforations 33 into liquid separating means 30. It is to be noted that in the example of FIGURE 3, the initial contact between caustic solution and gas stream occurs when the gas stream passes through the liquid curtain so immediately a portion of the saponifiable substances and other impurities carried by the gas stream are removed by washing. The remaining saponifiable substances and other impurities entrained in the dirty gas stream are carried upwardly through perforations 33 into liquid separating chamber 30. It has further been realized that a portion of the caustic solution passing downwardly into chamber 29 through perforations 33 is entrained by the air stream to be carried upwardly through perforations 33 along with the remaining entrained saponifiable substances and other impurities. It is to be understood that other apparatus for gas-liquid control can be used within the scope of the present invention.

The air stream passing through perforations 33 impinges on first pad 34 and a large portion of the entrained liquids, saponifiable substances, and other substances are deposited on the pad. A saponification reaction occurs on the surface of pad 34 to convert a portion of the saponifiable substances carried by the gas stream, which substances have been deposited on pad 34, to soap. The soap solution from the saponification reaction, as well as the entrained caustic solution and other materials originally entrained in the air stream which are deposited on pad 34, coalesce and flow to the bottom surface of the pad 34 to drop to the upper surface of plate 32 in countercurrent relation through the upflowing stream of gas. The liquid which falls to plate 32 from pad 34 is re-entrained in the gas stream or flows downwardly through perforations 33 into chamber 29.

It will be noted that liquid which flows through perforations 33 from the upper surface of plate 32 can include not only liquid pumped from reservoir 39 but also liquid returned to plate 32 from pad 34. The liquid which falls through chamber 29 is collected on plate 40 and flows along plate 40 to outlet 41 of chamber 29 to be returned to reservoir 39.

A portion of the liquid, including various previously listed impurities and caustic solution, is re-entrained in the gas stream emitted from the downstream surface of pad 34 and such re-entrainment substances are deposited on pad 35 where more of the saponifiable substances carried by the air stream are converted to soap. Advantageously, pad 35 is disposed in chamber 26 at an angle to the longitudinal axis of chamber 30 so the liquid deposited on the pad flows through the pad by gravity to conduit 38 and is essentially completely removed from the pad without liquid re-entrainment in the flowing gas stream. In this manner, it is possible to remove most of the liquid from the gas stream without flooding pad 35 so liquid carryover is prevented. Liquid which drains through pad 35 to the inlet of conduit 38 is returned to reservoir 39 by means of conduit 38.

As caustic is converted to soap in the operation of the apparatus in accordance with the present invention, the strength of the caustic solution in reservoir 39 is diluted so a source of makeup caustic solution 45 can be provided to continuously or intermittently, add additional caustic to reservoir 39. The caustic added to the reservoir can, for example, be of much higher strength than the caustic in the reservoir. The concentration of the makeup caustic can be, for example, 20% and can be added to maintain the strength of the caustic solution in the reservoir. Likewise, a drain means 44 can be provided to continuously, or intermittently, drain liquid from the reservoir to prevent overflowing.

In applications where a saponifiable substance is the main impurity carried by the flowing gas stream, it is to be noted that a relatively clean solution having a high concentration of soap-like material will be provided in reservoir 39 and the soap solution can, advantageously, be used as a general cleaning agent for other purposes. In applications where the liquid in reservoir 39 becomes dirty during operations, it is desirable to completely eliminate all of the dirty liquid from reservoir 39 before refilling the reservoir with clean solution. In such applications most of the dirt settles to the bottom of the reservoir so the bottom 46 of the reservoir can be tapered to eliminate dirt during the first part of the draining of the reservoir. Water supply 47, including spray heads 48, can be provided to wash down the reservoir and flush out the remaining dirt before the reservoir is filled with clean solution.

It has been recognized that in applications where liquid is supplied to plate 32 at low flow rates the saponifiable substances can burn in chamber 29. At low liquid flow rates sufficient heat is generated by the combustion to vaporize the liquid from the caustic solution so the fire is not quenched by the liquid. Therefore, in accordance with one feature of the present invention a thermal sensing element is provided downstream of plate 32 and is operatively connected to a valve 52 in bypass 51 around liquid control valve 42a. In accordance with the example of FIGURE 3, if a fire occurs in chamber 29 the temperature of the gas stream is increased and the increase is sensed by temperature element 53. Upon a selected increase in temperature valve 52 is opened to bypass liquid flow control valve 42a and increase the flow of caustic solution to plate 32. The increased liquid flow quenches the flame and when the gas stream has been cooled to a selected temperature valve 52 is closed and normal operation is resumed.

The invention claimed is:
1. The method for removing saponifiable substances and particulate matter from a flowing gas stream including: passing a stream of gas carrying saponifiable substances and particulate matter through labyrinth means so that at least a portion of said saponifiable substances carried by said gas stream are deposited by impingement on said labyrinth means; distributing selected caustic solution over at least a portion of the surface of said labyrinth means so a portion of said saponifiable substances are saponified on the surface of said labyrinth means by said caustic solution to enhance removal of said particulate matter and to clean said labyrinth means; and, removing liquid including unreacted caustic solution, products of said saponification, and particulate matter separated from said gas stream from said labyrinth means.

2. The method of claim 1 wherein said caustic solution is distributed over at least a part of the surface of said labyrinth means by passing said gas stream through a curtain of said selected caustic solution to entrain droplets of said caustic solution so such entrained droplets are carried by said gas stream to said labyrinth means.

3. The method of claim 1 wherein said caustic solution flows vertically downward by gravity through said labyrinth means to be distributed over at least a portion of said labyrinth means.

References Cited

UNITED STATES PATENTS

| | | | |
|---|---|---|---|
| 2,333,193 | 11/1943 | Persson et al. | 55—89 |
| 2,889,004 | 6/1959 | Nutting et al. | 261—113 |
| 3,090,179 | 5/1963 | Powell | 55—233 |
| 3,183,645 | 5/1965 | Teller | 55—20 |
| 3,237,381 | 3/1966 | Hvostoff et al. | 55—90 |
| 3,242,652 | 3/1966 | Malenchini | 55—242 |
| 3,260,189 | 7/1966 | Jensen. | |

OTHER REFERENCES

Buffalo Forge Company Technical Data Bulletin AP–225, "Gas Absorbers for Atmospheric Pollution Control and Gas Recovery," received Sept. 24, 1965.

REUBEN FRIEDMAN, *Primary Examiner.*

C. N. HART, *Assistant Examiner.*